United States Patent [19]

Cole

[11] Patent Number: 4,814,556

[45] Date of Patent: Mar. 21, 1989

[54] CAMSTACK AND SWITCH ASSEMBLY AND TIMER UTILIZING SAME

[75] Inventor: Ronald E. Cole, Greenwood, Ind.

[73] Assignee: Emhart Industries, Inc., Indianapolis, Ind.

[21] Appl. No.: 144,161

[22] Filed: Jan. 15, 1988

Related U.S. Application Data

[63] Continuation-in-part of Ser. No. 48,497, May 8, 1987, abandoned, which is a continuation-in-part of Ser. No. 932,606, Nov. 20, 1986, abandoned.

[51] Int. Cl.[4] .......................... H01H 43/00; H01H 3/42; F16H 53/00

[52] U.S. Cl. .......................... 200/38 R; 200/6 B; 200/27 R; 200/27 B; 200/30 R; 200/38 B; 200/38 C; 200/574; 74/567

[58] Field of Search .................. 200/6 B, 6 BA, 6 BB, 200/27 R-27 BB, 30 R-30 AA, 38 R, 38 B, 38 C, 153 L, 153 LB; 74/567, 568 M, 568 T, 1

[56] References Cited

U.S. PATENT DOCUMENTS

| | | | |
|---|---|---|---|
| 3,142,730 | 7/1964 | Slonneger et al. | 200/38 C |
| 3,657,493 | 4/1972 | Horsley | 200/6 B |

FOREIGN PATENT DOCUMENTS

| | | | |
|---|---|---|---|
| 1196755 | 7/1965 | Fed. Rep. of Germany | 200/6 B |

*Primary Examiner*—J. R. Scott
*Attorney, Agent, or Firm*—Carl A. Forest

[57] ABSTRACT

The hub of a camstack is in the shape of a cone. There are ribs carried on the cone surface with the ribs having cam surfaces that are substantially parallel to the cone surface. The camstack is particularly adaptable for actuating a plurality of individual switches in a direction at an angle to the central axis and to the lines normal to the central axis. The individual switches are carried by a single common support member. The camstack permits the building of less expensive, smaller and more reliable appliance timers.

7 Claims, 2 Drawing Sheets

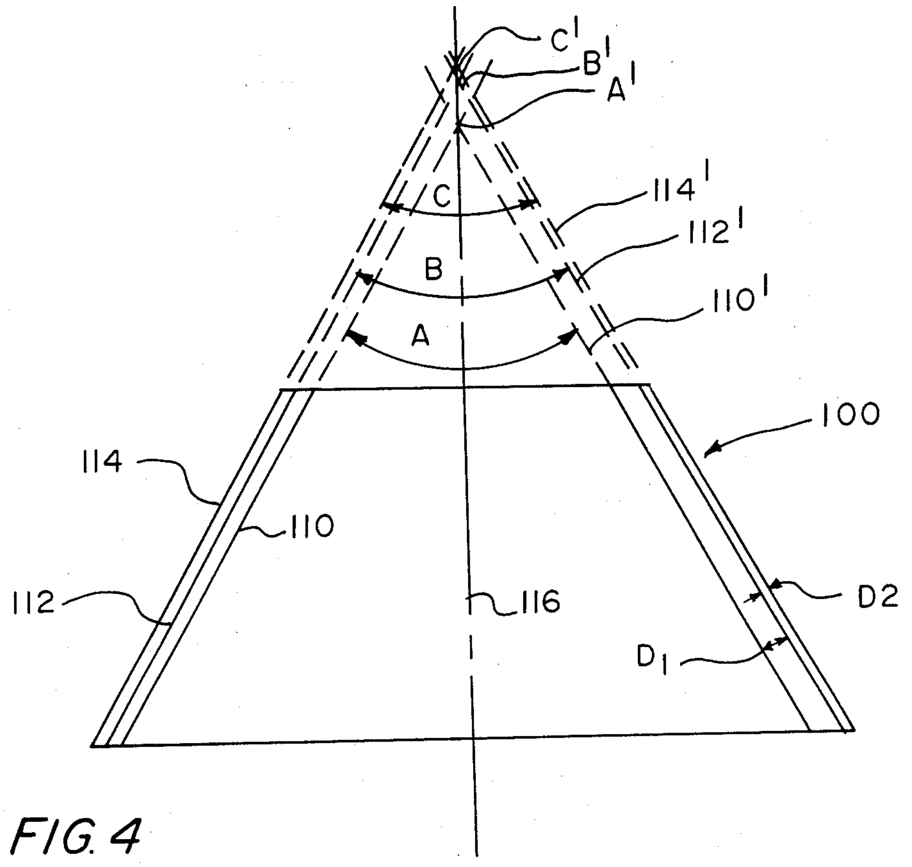
FIG. 4
FIG. 5
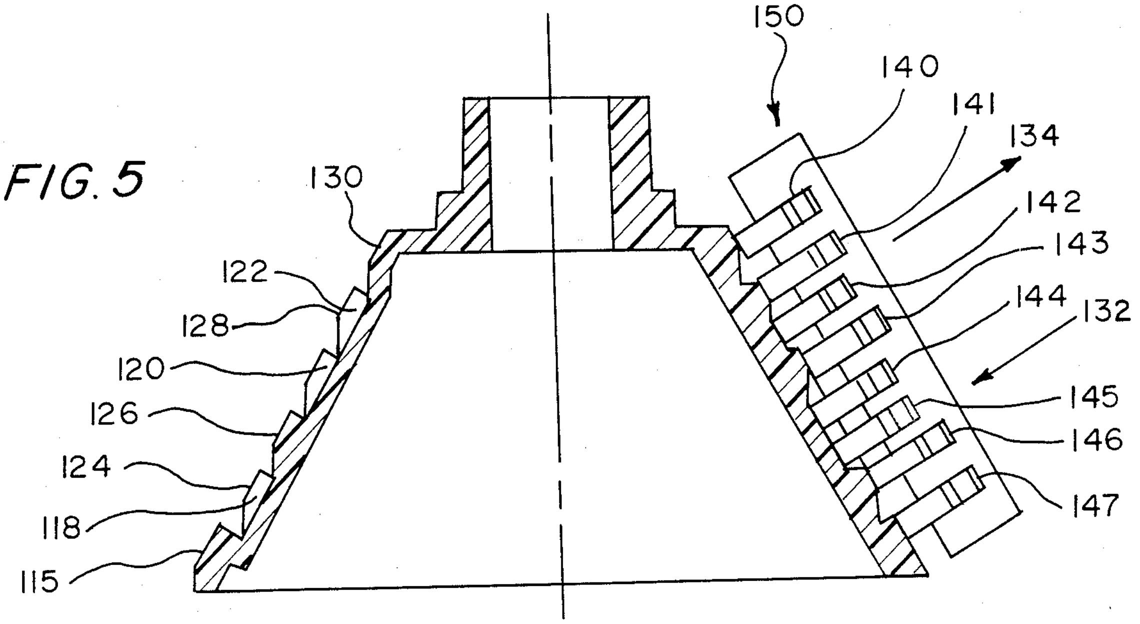

CAMSTACK AND SWITCH ASSEMBLY AND TIMER UTILIZING SAME

BACKGROUND OF THE INVENTION

This application is a continuation-in-part of application Ser. No. 07/048,497, filed 05-08-87 now abandoned, which was itself a continuation-in-part of application Ser. No. 06/932,606, filed 11-20-86, now abandoned.

The present invention relates to a camstack and more particularly to a camstack that is useful for actuating individual switches that are carried by a single common support.

Camstacks of the type of the present invention are used extensively in timing mechanisms to open and close electrical switches which in turn make and break electrical circuits to an appliance to control the appliance's functions. As the operation of appliances becomes more complicated, the need for more control cycles on the camstack becomes necessary. It is at the same time desirable, however, that the timing mechanisms remain small and compact. To this end, ways and means are continually being sought to keep the camstack as small as possible.

In U.S. Pat. No. 3,142,730 there is described and claimed a stepped cam wherein the steps decrease in diameter in going from the bottom of the camstack to the top. This arrangement aided in reducing the size of the camstack. The camstack of the present invention also aids in reducing the size of the camstack and in addition makes it easier to use individual switches carries by a single common support. This aids in reducing the size of a complete cam switch assmebly and in addition, aids in reducing manufacturing costs.

SUMMARY OF THE INVENTION

In accordance with the invention there is provided a camstack which, in general, comprises a hub having an outer surface traced by a moving straight line passing through a fixed vertex and a plurality of ribs extending from the outer surface, each of the ribs having a cam surface substantially parallel to the first outer surface. In other words, the invention provides in a conical camstack of the type having a hub rotatable about a central axis, the improvement comprising a means for opening and closing a plurality of switches in a direction at an angle to the central axis and to the lines normal to the central axis. Framed in terms of the geometry of the camstack, the invention provides a camstack comprising: a first cam surface aligned along a first cone formed about a central axis of revolution of the camstack, wherein a projection of a locus of points from the first cam surface forms a first included angle with the central axis of revolution at a first vertex; at least one other cam surface aligned along a second cone formed about the central axis of revolution, wherein a projection of a locus of points from the one other cam surface forms a second included angle with the central axis of revolution at a second vertex; portions of the first cam surface and portions of the one other cam surface cooperating to provide cam lobe means for opening and closing a switch means in a direction at an angle to the central axis and to the line normal to the central axis. Preferably the projection of the first cam surface and the projection of the one other cam surface are equidistant between each other along these lengths. Preferably, the invention also provides a switch means engaging the cam surfaces. The invention further provides a timer comprising: a camstack rotatable about an axis of rotation; means for rotating the camstack about the axis; electrical switch means; and cam means on the camstack for opening and closing the electrical switch means in a direction at an angle to the axis and the lines normal to the axis. Preferably the camstack includes a plurality of cam surfaces and a projection of points along one cam surface intersecting the axis is parallel to a projection of points along the other cam surface(s) intersecting the axis.

The camstack according to the invention not only provides a more compact camstack assembly, but can be manufactured more reliably and accurately than prior art camstacks. Numerous other features, objects and advantages of the invention will become apparent from the following detailed description when read in conjunction with the accompanying drawings.

BRIEF DESCRIPTION OF THE DRAWINGS

FIG. 4 is a diagramatic view of a camstack illustrating the invention; and

FIG. 5 is a section of a camstack based on the view of FIG. 4.

DETAILED DESCRIPTION OF THE INVENTION

Figure 1:
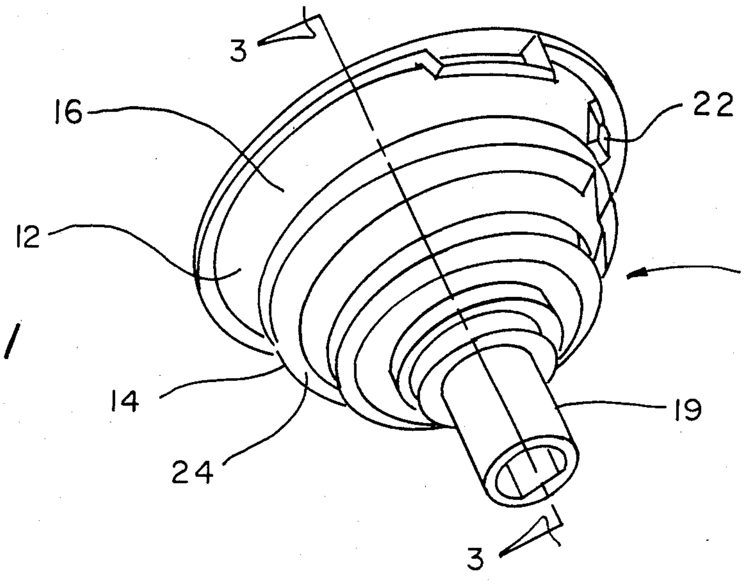
FIG. 1 is a view of the camstack of the invention.
Figure 2:
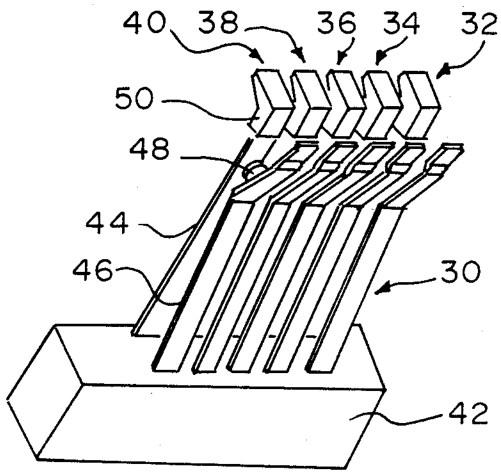
FIG. 2 is a view showing switches that can be used with the camstack of the invention.

Referring now to the drawings, there is shown in FIG. 1 a camstack 10 made in accordance with the invention. Camstack 10 includes a hub 12 and a plurality of ribs 14 extending from the hub. The outer surface 16 of hub 12 is conical. That is, surface 16 is traced by a moving straight line passing through a fixed vertex. The cam surfaces 18, 20, 22, 24, and all others not shown that are provided on ribs 14 are substantially parallel to the outer surface 16 of the hub 12. The camstack can be rotated through a shaft (not shown) which could be held in bearing 19. The camstack including the ribs and the bearing are fabricated of a thermoplastic material such as acetal.

in FIG. 2, there is shown a set of electrical switch means 30 which can be used in conjunction with camstack 10. Switch means 30 includes a plurality of individual switches 32, 34, 36, 38 and 40 carried by a common support member 42. Each of the switches includes electrical contact blades 44 and 46 each having mating electrical contacts 48. Each of the blades 44 also includes a cam follower 50 which engage outer surface 16 or the cam surface of ribs 14. The blades and the electrical contacts are fabricated from a good electrically conductive material such as copper or silver.

Figure 3:
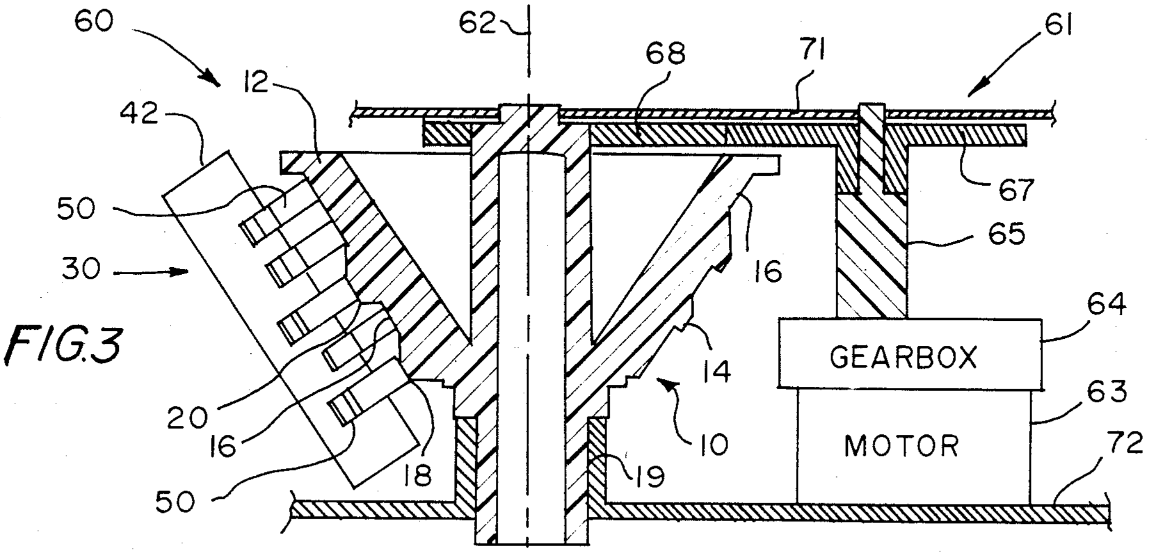
FIG. 3 shows a timer according to the invention in the Figure including a camstack section taken along the line 3—3 of FIG. 1.

Referring now to FIG. 3, a preferred embodiment of a timer 60 utilizing the camstack 10 of FIG. 1 and the switch means 30 of FIG. 2 is shown. The timer 60 also includes a means 61 for rotating the camstack 10 about its central axis 62, which means 61 comprises motor 63, gearbox 64, drive member 65, and gears 67 and 68. The above timer components are supported between supports 71 and 72. The motor 63, gearbox 64, drive member 65, gears 67 and 68 and supports 71 and 72 may be conventional timer components and thus will not be discussed in detail herein. As shown, cam followers 50 of switch means 30 ride on either the hub outer surface 16 or the outer cam surfaces of ribs 14 to open and close electrical contacts 48 of blades 44 and 46, the contacts being opened when a cam follower engages outer surface 16 of hub 12 and closed when a cam follower engages the cam surfaces of ribs 14.

In order to more fully understand the invention, reference is now made to FIGS. 4 and 5 wherein a conical camstack is shown diagramatically in FIG. 4 with a completed conical camstack based on the view of FIG. 4 being shown in FIG. 5.

Referring to FIG. 4, a conical camstack 100 includes cam surfaces 110, 112 and 114 that are cones formed about a central axis of revolution 116 of the camstack. As shown, projections of a locus of points 110', 112' and 114' extending from each of the cam surfaces 110, 112 and 114 forms included angles A, B and C at vertices A', B' and C'. The vertices all lie on the central axis of revolution 116 and the included angles are equal. Also in the present embodiment, the distance D1 and D2 between a pair of cam surfaces is equidistant at all points throughout their circumference.

Referring now to FIGS. 4 and 5, portions of cam surfaces 112 and 114 are removed to provide recessed areas 118, 120, 122. The portions of cam surface 112 that remain in place provide projections 124, 126, 128, and 130 which act as cam lobes. Portions of cam surface 114 remaining form projection 155 which also acts as a cam lobe. The cam lobe open and close electrical switches 140 through 147 in directions 132, 134 respectively normal to the cam surfaces.

The timer 60 according to the invention is both more compact and more accurate than prior art timers. The camstack itself takes up less space than the prior art cylindrical camstacks. The cam surfaces parallel to the cam defined by the conical camstack permit a more compact switch means 30 and 150 as compared to the stepped conical camstacks of the prior art. Since the individual switches such as 32, 34, 36, 38, and 40 are all identical and in a compact, simple unit, it turns out that they also provide more uniform response than the prior art switches. Further, the cone is a more naturally stable shape than cylinders and pancakes of the prior art. Further the shape lends itself to molding more easily than the shape of prior art camstacks. The parallel surfaces permit the unit to slide easily out of the mold. The compact parallel switch units 30, 150 are more easily installed in the manufacturing process than the switch units used with the stepped conical camstacks of the prior art.

A novel camstack and timer utilizing the camstack has been described. It is evident that those skilled in the art may now make numerous uses and modifications of the embodiments described without departing from the inventive concepts. Consequently, the invention is to be construed as embracing each and every novel feature and combination of features present in and/or possessed by the camstack and timer described.

What is claimed is:

1. In a conical camstack of the type having a hub rotatable about a central axis, the improvement comprising cam means for opening and closing a plurality of switches in a direction at an angle to said central axis and to the lines normal to said central axis.

2. A camstack comprising:

a first cam surface aligned along a first cone formed about a central axis of revolution of said camstack, wherein a projection of a locus of points from said first cam surface forms a first included angle with said central axis of revolution at a first vertex;

at least one other cam surface aligned along a second cone formed about said central axis of revolution, wherein a projection of a locus of points from said one other cam surface forms a second included angle with said central axis of revolution at a second vertex; and surface means for connecting portions of said first cam surface and portions of said one other cam surface to provide cam lobe means for opening and closing an electrical switch in a direction at an angle to said central axis and to the lines normal to said central axis.

3. A camstack comprising:

a first cam surface aligned along a first cone formed about a central axis of revolution of said camstack, wherein a projection of a locus of points from said first cam surface forms a first included angle with said central axis of revolution at a first vertex;

at least one other cam surface aligned along a second cone formed about said central axis of revolution, wherein a projection of a locus of points from said one other cam surface forms a second included angle with said central axis of revolution at a second vertex; and surface means for connecting portions of said first cam surface and portions of said one other cam surface to provide cam lobe means for opening and closing an electrical switch at an angle normal to said first and one other cam surfaces.

4. A camstack according to claim 3 wherein the projection of said first cam surface and the projection of said one other cam surface are equidistant between each other along their lengths.

5. A cam-switch assembly comprising a camstack as recited in claim 3 and switch means for engaging said cam surfaces provided by said camstack to be opened and closed thereby.

6. A timer comprising:

a support;

a camstack mounted on said support and rotatable about an axis of rotation;

means for rotating said camstack about said axis;

electrical switch means mounted on said support; and cam means on said camstack for opening and closing said electrical switch means in a direction at an angle to said axis and the lines normal to said axis.

7. A timer as in claim 6 wherein said cam means includes a plurality of cam surfaces and wherein a projection of points along one cam surface and intersecting said axis is parallel to a projection of points along another cam surface and intersecting said axis.

* * * * *